United States Patent [19]
Moody

[11] Patent Number: 6,059,411
[45] Date of Patent: May 9, 2000

[54] ADJUSTABLE SIDE PIECE FOR GLASSES

[75] Inventor: Paul E. Moody, Barrington, R.I.

[73] Assignee: The United States of America as represented by the Secretary of the Navy, Washington, D.C.

[21] Appl. No.: 09/226,621

[22] Filed: Dec. 21, 1998

[51] Int. Cl.[7] .................................................. G02B 5/20
[52] U.S. Cl. ........................... 351/118; 351/111; 351/119
[58] Field of Search .................................. 351/111, 118, 351/119, 123, 63, 41

[56] References Cited

U.S. PATENT DOCUMENTS 5,448,317  9/1995  Huang ...................................... 351/118

*Primary Examiner*—Hung Xuan Dang
*Attorney, Agent, or Firm*—Michael J. McGowan; James M. Kasischke; Prithvi C. Lall

[57] ABSTRACT

A side piece for eye glasses includes a front side piece portion and a rear side piece portion. The front side piece portion includes a forward end and a rearward end with an elongated, open-ended slot formed therein. The open end of the elongated open-ended slot is directed to the rearward end of the front side piece portion. The rear side piece portion includes a forward end and a rearward end with an elongated, closed-ended slot formed therein. The rear side piece portion is additionally formed of a spring metal. A stop pin is inserted through the longitudinal slot of the rear side piece portion and fixed to the front side piece portion adjacent the rear end thereof. The rear side piece portion is slidably inserted into the open-ended longitudinal slot of the front side piece portion to a point defined by contact of the stop pin with one end of the closed-end longitudinal slot, and slidably removed from the open-ended longitudinal slot to a point defined by contact of said stop pin with the remaining end of the closed-end longitudinal slot. Extension of the rear side piece portion enables automatic bending of the spring metal forming the rear side piece portion.

13 Claims, 3 Drawing Sheets

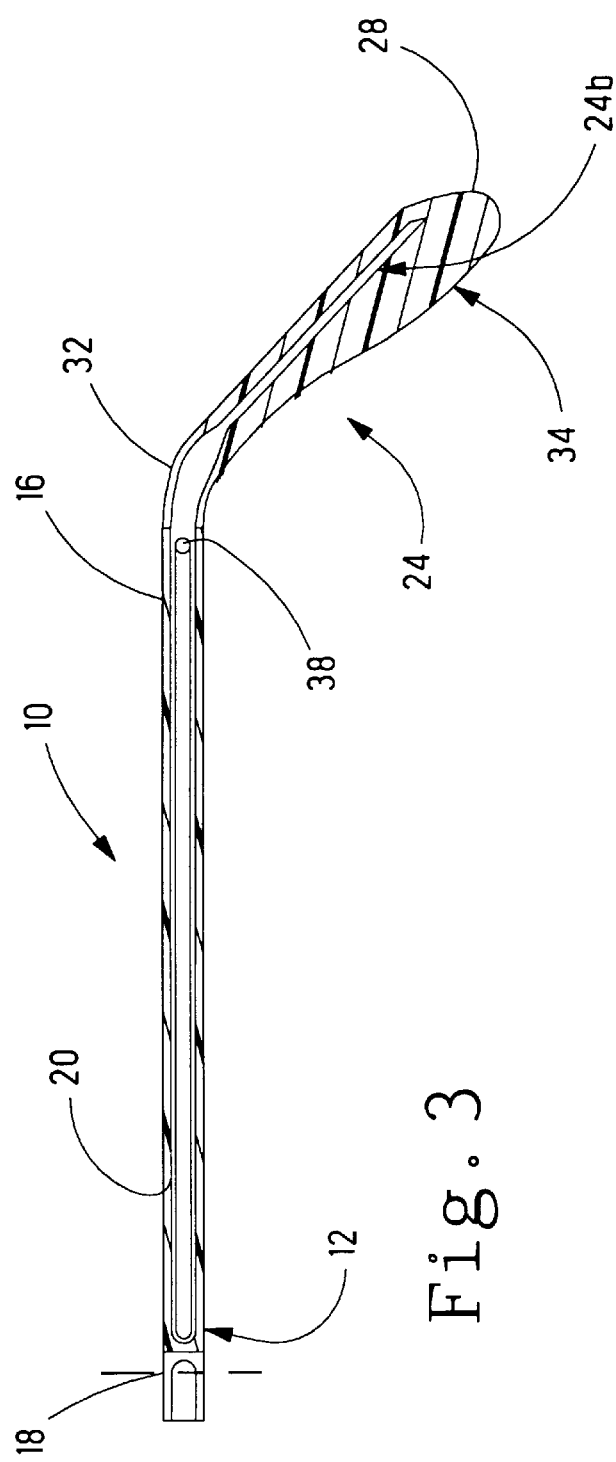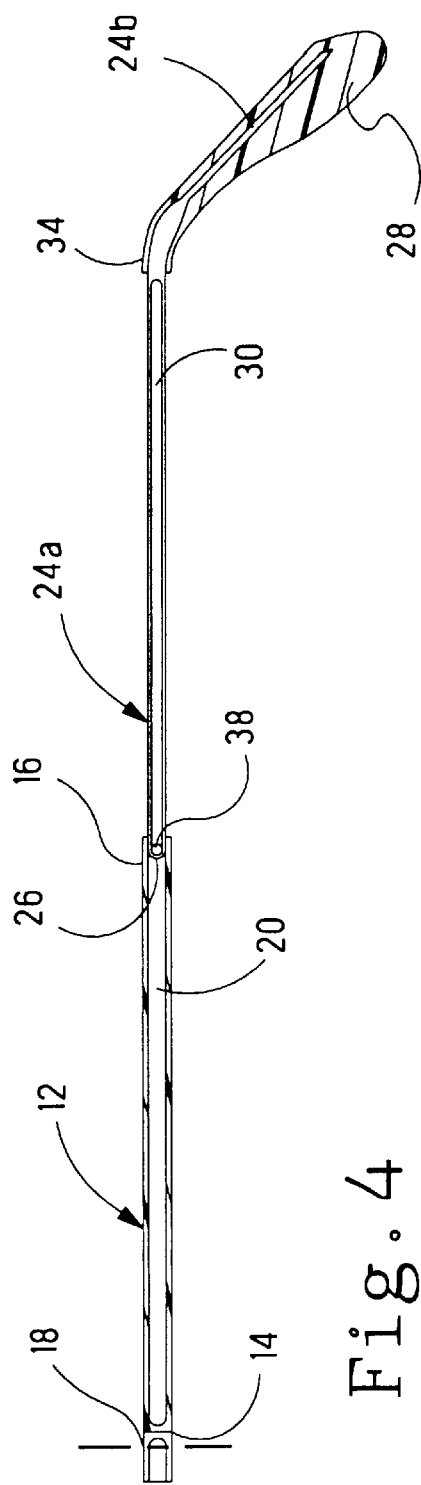

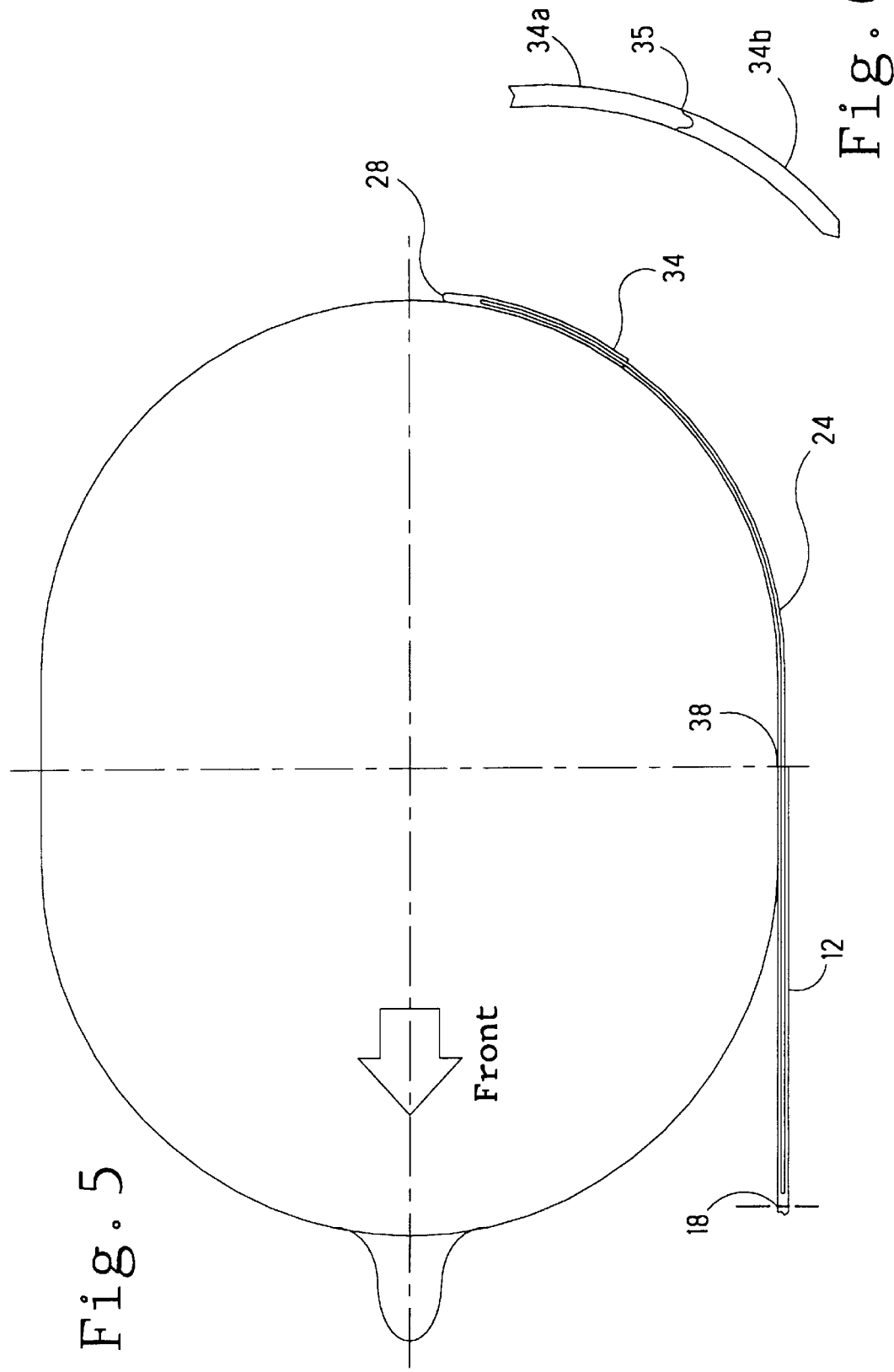

ADJUSTABLE SIDE PIECE FOR GLASSES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention generally relates to non-slip safety glasses. More particularly, the invention relates to non-slip safety glasses in which secure and comfortable eye protection is provided without necessitating the attachment of special devices to eye glass frames.

(2) Description of the Prior Art

Existing safety glass frames are designed to curve over a persons ears to hold them in place. This holding feature is usually insufficient when a person is engaged in rapid motion actions or looking down for a long period of time. If the sides of the frames squeeze a person's head to hold them in place, it could prove to be quite uncomfortable. Therefore, a number of products are on the market which attach to the eye glass frames to hold them in place. Some of these devices attach additional loops which fit over the ear while others tie one side of the frame to the other in back of a person's head. Unfortunately, these devices may cause excessive pressure on a person's head, are bulky, some do not fit in an eyeglass case, and mess up a persons hair when they are put in place or removed. These devices are also often ineffective when a person is involved in physical activity, which causes the person to sweat. If the safety glasses slip at the wrong time then eye damage could result. Even worse, the constant head pressure or slippage could be so annoying to the wearer, that he/she removes them completely with the resultant complete removal of eye protection.

FIGS. 1 and 2 reflect the configuration of conventional safety glasses 100 with conventional side pieces 102. Each side piece 102 typically contains a hinge point 104 where the side pieces 102 are connected to the eye portion 110 of the glasses 100. A reinforcing metal portion 106 defines the structure of the side pieces 102 and a plastic cover 108 is formed over the metal portion 106 of the side piece 102. The reinforcing metal portion 106 is used to both strengthen the plastic cover 108 and to provide an anchor for a hinge pin assembly 112 at the hinge point 104. If the glasses are too loose to properly fit a person's head, then the reinforcing metal portion 106 and plastic cover 108 are bent inwardly until they are tight on the person's head. If the side pieces 102 are bent too much, they exert too much pressure against the wearer's head. If the side pieces 102 art not bent enough, they can slip to the point where the glasses 100 fall of off a wearer's face.

The following patents, for example, disclose eyeglasses or safety glasses in which the side pieces are adjustable in a longitudinal direction in order to adjust the glasses to a wearer's head, but do not disclose the extendable and easily bendable side piece of the instant invention in which it is no longer necessary to attach special devices to eye glass frames or place an excessive squeeze on a wearer's head.

U.S. Pat. No. 27,359 to Gordon et al.;
U.S. Pat. No. 1,751,804 to Fischer;
U.S. Pat. No. 3,416,858 to Bowes; and
U.S. Pat. No. 3,873,192 to Anderson.

Specifically, the patent to Gordon et al. disclose spectacles having a spring stop or stops which act to arrest and determine the movement of the slide as well as render the slide uniform in its movements either under wear or in case of any ordinary dents or injuries to which the temples of the spectacles are liable.

The patent to Fischer discloses an extension holder for eyeglasses which proposes the use of two sections telescopically arranged, the front sections being connected with lens frames, and the rear sections being formed with ear engaging members, and a means being provided for holding these sections in relative longitudinal and rotative adjusted positions. One of the temple sections is formed with opposite elongated slots engaged by a transverse pin secured in the other of the sections. The larger of the sections is formed with an external tapered thread engaged by a nut for locking the sections in longitudinally fixed positions.

Bowes discloses an eyeglass temple comprising front and rear sections joined together such that one of the sections has a wall defining an axially extending recess. A second section comprises an elongated metallic slide constructed and arranged to be snugly received and slide within the recess. The slide has a slit extending longitudinally thereof dividing the slide into upper and lower spin-like portions each of which carry detents for biting into portions of the recess wall to retain the sections together in a longitudinally fixed position upon reciprocal sliding of the slide therein.

Anderson discloses an adjustable temple for eyeglasses in which the temples are adapted to be connected to the frame of a pair of eyeglasses. Each temple is of like construction and includes first and second members slidably interconnected and manually adjustable to assume selected positions of adjustment in a longitudinal direction wherein the length of the temple may be varied. One of the members is provided with an elongated longitudinally extending guide way in which a portion of the other member is slidably disposed. An elongated, longitudinally extending resilient member is disposed within the guide way. A portion of the other member is positioned between and is in frictional engagement with the resilient member and a wall of the guide way. The manual adjustment of the members is effected only when a predetermined amount of external force is applied so as to overcome the frictional engagement retaining the members in a selected longitudinal position of adjustment.

SUMMARY OF THE INVENTION

Therefore it is an object of this invention to provide safety glasses which are comfortable and secure to wear.

Another object of this invention is to provide safety glasses in which side pieces of the safety glasses are constructed so as to securely conform to a wearer's head.

Still another object of this invention is to provide safety glasses in which side pieces thereof are extendable in order to conform and secure the extended side pieces around the wearer's head.

A still further object of the invention is to provide safety glasses in which the side pieces are constructed of a first plastic portion and a second extendable metallic spring portion, the metallic spring portion being spring-biased to naturally conform to a wearer's head.

Yet another object of this invention is to provide a safety glasses having a pair of two-part side pieces which is simple to manufacture and easy to use.

In accordance with one aspect of this invention, there is provided a side piece for eye glasses including a front side piece portion and a rear side piece portion. The front side piece portion includes a forward end and a rearward end with an elongated, open-ended slot formed therein. The open end of the elongated open-ended slot is directed to the rearward end of the front side piece portion. The rear side piece portion includes a forward end and a rearward end with an elongated, closed-end slot formed therein. The rear side piece portion is additionally formed of a spring metal. A stop pin is transversely inserted through the longitudinal slot of the rear side piece portion and fixed to the front side piece portion adjacent the rear end thereof. The rear side piece portion is slidably inserted into the open-ended longitudinal slot of the front side piece portion to a point defined by contact of the stop pin with one end of the closed-end longitudinal slot, and slidably removed from the open-ended longitudinal slot to a point defined by contact of said stop pin with the remaining end of the closed-end longitudinal slot. Extension of the rear side piece portion enables automatic bending of the spring metal forming the rear side piece portion.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 3 is a side view of a non-extended side piece for a pair of glasses according to a first preferred embodiment of the present invention;

FIG. 4 is a side view of the side piece of FIG. 3 shown in an extended position;

FIG. 5 is a top plan view of a wearer's head having the extended side piece of FIG. 4 fitted thereto; and FIG. 6 is a top plan view of an alternative to the embodiment shown in FIG. 3 relating to an extended rear plastic cover to join side pieces via a poppet bead type connection.

DESCRIPTION OF THE PREFERRED EMBODIMENT

In general, the present invention is directed to a device for securing eye protection on a wearer without necessitating the attachment of special devices to eye class frames or excessively squeezing a wearer's head.

Figure 1:
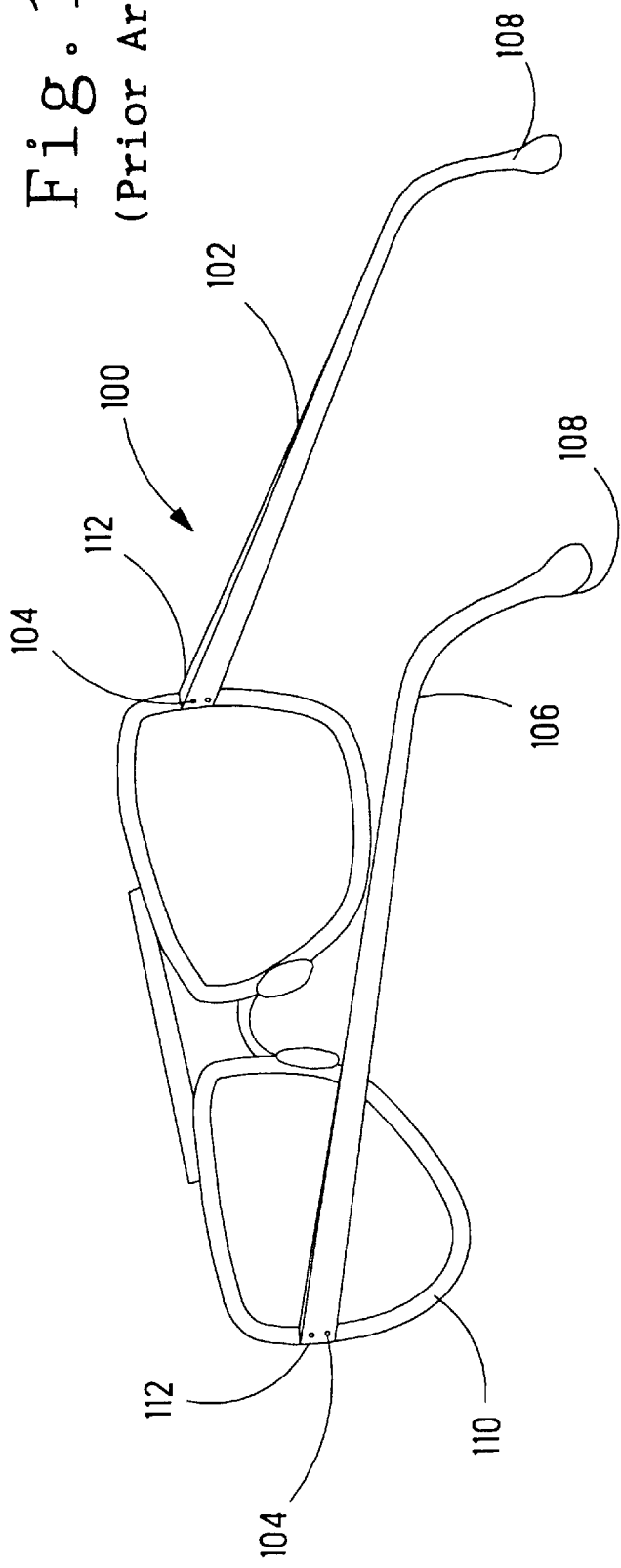
FIG. 1 is a rear perspective view of a pair of conventional eyeglasses.
Figure 2:
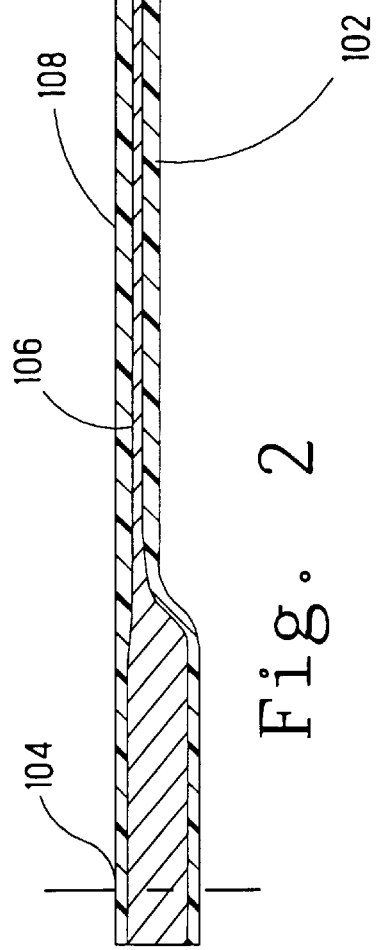
FIG. 2 is a side view of a side piece of the conventional eyeglasses shown in FIG. 1.

FIGS. 3 and 4 reflect the inventive variation from the conventional side piece 102 illustrated in FIGS. 1 and 2. In FIG. 3 a side piece 10 of the present invention is shown in a collapsed position and in FIG. 4 the side piece 10 is shown in an extended position. It should be understood that while only a single side piece 10 is shown and described, a pair of side pieces 10 will be required for connection to the conventional eye portion 110 of the glasses to which the invention is applied.

In further detail, the side piece 10 includes an elongated front side piece portion 12 having a forward end 14 and a rearward end 16. The forward end 14 thereof is connected to the conventional eye portion 110 of glasses at a hinge point 18. In the figures, only the side pieces 10 are shown, it being understood that the remainder of the glasses is similar to the conventional glasses 100, including the eye portion 110 thereof, illustrated in FIGS. 1 and 2. Returning to the description of the present invention, the front portion 12, with the exception of the hinge point 18 thereof, is entirely formed of plastic and includes an elongated slot 20 formed therein. The elongated slot 20 is shown to be substantially rectangular for reasons to be described, however, the shape of the elongated slot 20 may be varied to the extent necessary to conform to a remaining portion of the side piece described in the following. The hinge point 18 is formed of reinforcing metal and connects to a corresponding hinge (not shown) of the conventional eye portion 110.

The side piece 10 additionally includes a rear portion 24 having a forward end 26 and a rearward end 28 connected by an optional bend 32. The rear portion 24 comprises an elongated portion 24a and rounded portion 24b. An optional bend 32 is formed between the elongated portion 24a and the rounded portion 24b so as to conform to the conventional glasses gripping location behind a wearer's ear, similar to a conventional side piece 102. The elongated portion 24a is formed entirely of a reinforcing or bendable spring 28 and is elongated and slightly narrower than the front portion 12 of the side piece 10 so as to slidably insert into the elongated slot 20 of the front side piece portion 12. More specifically, the rear side piece portion 24 is substantially flat at elongate portion 24a and slightly rounded at rounded portion 24b for reasons to be more fully described.

The rear side piece portion 24 includes a closed-end elongated slot 30 therein extending in the substantially flat portion 24a from a location adjacent the forward end 26 of the rear side piece portion 24 to a location just prior to the optional bend 32 at the terminal end of the rear side piece elongated portion 24a. The area defining the optional bend is that which is slightly rounded at 24b. The purpose of this shape is understood from the perspective of a wearer and to increase the comfort of the optional bend portion 32 of the side piece 10. A plastic cover 34 is attached to the optional bend portion 32 at the terminal end 28 of the rear side piece portion 24 and the plastic cover 34 stops immediately adjacent to the longitudinal slot 30 of the rear side piece portion 24. In effect, the plastic cover 34 will cover the rounded portion 24b of the rear side piece 24. When the rear side piece portion 24 is fully inserted into the longitudinal slot 20 of the front side piece portion 12, the rear plastic cover 34 joins flush with the front side piece portion 12, also formed of a plastic material, to form a continuous side piece 10 having the outward appearance of a conventional side piece.

In order for the front side piece portion 12 and rear side piece portion 24 to maintain a proper positioning with respect to each other and to define a stop limit for extension of the rear side piece 24 from the longitudinal slot 20 of the front side piece 12, there is provided a stop pin 38 in the front side piece portion 12. More specifically, the stop pin 38 is transversely oriented with respect to side walls of the side piece portion 12 and fixed thereto adjacent the rearward end 16. The pin 38 is fit so as to pass through the longitudinal slot 30 of the rear side piece 24 and defines the longitudinal movement of the rear side piece 24 within the front side piece 12 in accordance with a length of the longitudinal slot 30 formed in the rear side piece portion 24.

Accordingly, while the conventional plastic cover 108 of FIGS. 1 and 2 is one piece, the plastic side piece shown in FIGS. 3 and 4 is Split so that there is a front plastic covered side piece 12 and a rear plastic cover 34 at a terminal end of the rear side piece 24. The reconfigured reinforcing metal of the present invention as provided in the rear side piece 24 is permanently adhered to the rear plastic cover 34, while it fits into the rectangular slot 20 in the front plastic side piece portion 12. The area in the front side piece 12 where the reinforcing metal of the rear side piece 24 fits, is cut away (crosshatched) in FIG. 3, for clarity. FIG. 3 also shows the stop pin 38. Once the flat portion 24a of the reinforcing metal of the rear side piece 24 is inserted into the elongated slot 20 of the front side piece 12, the stop pin 38 is permanently installed through both sides of the front side piece 12 and the slot 30 in the reinforcing metal of the rear side piece 24. This, in effect, traps the reinforcing metal of the rear side piece 24 in the slotted hole 20 of the front side piece 12. However, the reinforcing metal of the rear side piece 24 is still free to move axially in the elongated slot 20 in front side piece 12. In order to permit this sliding action to occur, it is no longer possible to utilize the reinforcing metal to support the hinge point as shown in FIGS. 1 and 2. Therefore, the front side piece 12 of the present invention contains the fixed piece of reinforcing metal as the hinge point 18 at the forward end 14 thereof which is used to support the hinge pin of the conventional eye portion 110.

FIG. 4 particularly shows the inventive side piece 10 when it is extended. In the configuration shown, the elongated portion 24a of the rear side piece 24 is withdrawn a maximum amount as it has traveled the full length of its slot 30 and been stopped from any further travel by stop pin 38.

Referring now to FIG. 5, it can be seen that when the inventive side piece 10 is applied to a wearer's head, the pre-set force of the reinforcing metal of the rear portion side piece 24 deflects so that the rear side piece 24 and its associated rear plastic cover 34 tend to wrap around the back of a person's head. In this configuration, it is very unlikely that the side piece 10 or the glasses to which they are attached will slip. In addition, the amount that the reinforcing spring metal of the rear side piece 24 is withdrawn from the elongated slot 20 in the front side piece 12 can be varied to accommodate various sizes of a wearer's head and in order to suit the most comfortable position of an individual wearer.

If extreme physical activity is anticipated then FIG. 6 illustrates an optional embodiment wherein of the terminal ends 28 of the right and left side of the rear plastic covers 34a and 34b can be joined together. In this embodiment, optional bend 32 can be omitted and a connecting means 35 can be formed at the terminal ends. Connecting means 35 can be a poppet bead connection or another fastener known in the art.

In both the first and optional embodiments, the reinforcing metal of the rear portion side piece 24 can be collapsed into the front plastic cover 12 for conventional storage in an eye glass case or pocket, both prior to and following use. This makes them very convenient to store. In addition, there are no loose pieces which may be lost or misplaced.

The configuration shown provides increased confidence that safety glasses will not slip and leave a wearer's eyes either partially or completely unprotected. The configuration shown will provide a wearer with comfortable and customized eye protection. The configuration shown will fit in a conventional eye glass case for storage. The configuration shown has no loose or unattached parts which may be lost or misplaced, and can be mass produces without a significant increase in cost.

As an alternative to the configurations shown, it is possible to increase the size of the front plastic cover to make it out of metal in lieu of plastic. Other alternatives include the use of a hook and eye or other fastening systems to connect the right and left side pieces behind a person's head.

In addition, the rear plastic cover may be straight or bent and if necessary, an additional piece could be hinged from one rear cover to the other, in order to reach around a person's head. The concept could be extended to conventional eye glasses in addition to the protective eye wear described.

By the present invention, a safety eyeglass is proposed in which securement of the safety glasses to the wearer's head is achieved in a more efficient manner than previously known in the art.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A side piece for eye glasses comprising:
   a front side piece portion having an open-ended elongated slot formed therein, said front side piece portion having a forward end and a rearward end, the open end of the open-ended elongated slot being at the rearward end of said front side piece portion;
   a rear side piece portion having a closed-ended longitudinal slot formed therein, said rear side piece portion having a forward end and a rearward end having an elastically bendable shape;
   a stop pin inserted through the longitudinal slot of said rear side piece portion and fixed to said front side piece portion adjacent the rear end thereof; and
   said rear side piece portion being slidably insertable into the elongated slot of said front side piece portion to a point defined by contact of said stop pin with one end of the longitudinal slot formed in said rear side piece portion and slidably removable from the elongated slot of said front side piece portion to a point defined by contact of said stop pin wit he remaining end of the longitudinal slot formed in said rear side piece portion, and extension of said rear side piece portion enables restoration of said rear side piece portion elastically bendable shape.

2. The side piece according to claim 1 further comprising a plastic cover formed on the rearward end of the rear side piece portion.

3. The side piece according to claim 2 wherein the rearward end of said rear side piece portion is bent to accommodate a fit around a wearer's ear.

4. The side piece according to claim 3 wherein the rearward end of said rear side piece portion is bent into a curved shape.

5. The side piece according to claim 1 wherein said rear side piece portion includes a substantially flattened rectangular portion and a substantially rounded portion, the substantially rounded portion defining the terminal end of said rear side piece portion.

6. The side piece according to claim 5 further comprising a plastic cover formed on the substantially rounded portion of the rear side piece portion.

7. The side piece according to claim 6 wherein the substantially rounded portion of said rear side piece portion is bent to accommodate a fit around a wearer's ear.

8. The side piece according to claim 6 wherein the forward end of said front side piece portion is formed of a reinforcing metal.

9. The side piece according to claim 1 further comprising a reinforcing metal formed at the front end of the front side piece portion.

10. The side piece according to claim 1 wherein said front side piece portion is formed of plastic from the rearward end thereof to a point adjacent the front end thereof.

11. The side piece according to claim 1 wherein said rear side piece portion is insertable into said front side piece portion to any of a plurality of selected positions, the selected length of insertion being fixed by a friction fit between said stop pin and the longitudinal slot formed in the rear side piece portion.

12. The side piece according to claim 1 wherein the rear side piece portion is capable of extending around a wearer's head.

13. The side piece according to claim 12 wherein the rearward end of the rear side piece portion has a connecting means joined thereto for joining with a complementary connecting means on another rear side piece portion.

* * * * *